United States Patent Office 3,491,147
Patented Jan. 20, 1970

---

3,491,147
N-(1-(ARYLTHIO AND ALKYLTHIO)ETHYL)-SULFONAMIDES
Richard A. Hickner, Midland, Mich., assignor to The Dow Chemical Company, Midland, Mich., a corporation of Delaware
No Drawing. Filed Sept. 26, 1966, Ser. No. 581,732
Int. Cl. C07c *143/78;* C08g *51/48*
U.S. Cl. 260—556                                    9 Claims

ABSTRACT OF THE DISCLOSURE

New compounds of the structure

in which Ar is a mono- or polycyclic aromatic ring, either unsubstituted or substituted with 1 to 3 lower alkyl groups of 1 to 4 atoms or 1 to 4 halogen atoms or a halogenated or alkylated derivative thereof, R is a lower alkyl group of 1 to 4 C atoms and R' is an alkyl group of 1 to about 18 C atoms, an aryl or aralkyl group, each of the latter aromatic groups having 0–3 lower alkyl or halogen groups on the aromatic ring, are made by reacting the corresponding N-lower alkyl-N-vinyl sulfonamide with a HSR' where R' has the designation above in the presence of an acid catalyst. The compounds are plasticizers for a variety of thermoplastic resins.

---

This invention relates to new N-thioether substituted aromatic sulfonamides and more particularly pertains to N-(1-(arylthio and alkylthio)ethyl)-sulfonamides having the generic formula

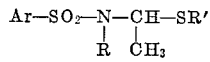

where Ar represents (1) an aryl group which can be monocyclic, such as phenyl, or polycyclic with fused or unfused rings such as naphthyl or biphenyl, and the aryl group can be unsubstituted or substituted with from 1 to 3 lower alkyl groups of from 1 to about 4 carbon atoms or 1 to about 4 halogen atoms or both halogen and alkyl groups, or (2) an aralkyl such as benzyl and halogenated or alkylated derivatives thereof in which the alkyl and halogen groups are defined as above, R is a lower alkyl group of from 1 to about 4 carbon atoms and R' represents an alkyl group having from 1 to about 18 carbon atoms, aryl and aralkyl groups each of the latter aromatic rings having from 0 to 3 lower alkyl or halogen groups or a combination of such groups, and to the method of making the compounds by reacting an N-lower alkyl-N-vinyl sulfonamide with a thiol of the structure HSR', where R' has the designation given above, in the presence of an acid catalyst.

The compounds of this invention are liquids of varying viscosity, in contrast to the usual N-hydrocarbon substituted sulfonamides of aryl sulfonic acids which are usually high melting solids. The compounds of this invention are compatible with a variety of synthetic thermoplastic resins, such as poly(vinyl chloride), poly(vinylidene chloride), cellulose acetate, copolymers of monoolefinically unsaturated monomers, with vinylidene cyanide, poly(acrylonitrile) and copolymers of acrylonitrile and a different monoolefinically unsaturated monomer. The sulfonamides of this invention are also compatible with numerous known liquid plasticizers for the above resins, such as liquid esters of phthalic and adipic acids, and can be blended with these esters for plasticizing uses.

The compounds of this invention are prepared by commingling, under substantially anhydrous conditions, an N-alkyl-N-vinyl sulfonamide of the structure

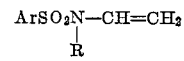

where Ar and R have the designation given above, with a thiol of the structure HSR' where R' has the designation given above and a strong, non-oxidizing protonic acid as a catalyst. Representative catalysts include $H_2SO_4$, HCl, HBr, aromatic sulfonic acids, such as benzene sulfonic acid or the toluenesulfonic acids, ammonium and alkali metal bisulfates, $PCl_3$, $PCl_5$, and $SOCl_2$. The latter three compounds can be used advantageously in the presence of small quantities of moisture such that substantially anhydrous acids are produced in situ. The preferred catalyst is substantially anhydrous HCl because of its effectiveness, ready availability and low cost. The amount of catalyst used can range from a trace to about 5 weight percent based on the total weight of the reaction mixture. The preferred range of catalyst is 0.001 to 1%.

Although any ratio of reactants will give some of the desired product, it is preferred to carry out the reaction with substantially stoichiometric proportions.

The reactants can be blended together and then acidified when small batches are prepared, but because of the exothermic nature of the reaction, it is preferred to acidify the thiol and add the N-alkyl-N-vinyl sulfonamide slowly to the acid-thiol mixture.

An inert diluent which can be readily removed from the mixture can be employed to help dissipate the heat of reaction. Representative diluents are liquid alkanes and their halogenated derivatives, particularly liquid fluorinated, chlorinated or brominated alkanes, including pentanes, hexanes, heptanes, octanes or others; petroleum fractions with relatively low boiling points, methylene chloride or bromide, chloroform, bromoform, carbon tetrachloride, butyl chloride, ethyl bromide, dichloro- or dibromoethane or compounds which have two or three chlorine, bromine or fluorine atoms on the molecule. Aromatic solvents include benzene, toluene, xylene, ethylbenzene, and tetramethylbenzene and liquid halogenated derivatives of the above aromatic hydrocarbons. It is apparent that any diluent which does not react with the vinyl groups or the thiol can be employed.

The reaction is ordinarily terminated within a few minutes after all the reactants have been mixed, but a post reaction of 15–30 minutes is desirable to insure its completion.

The reaction can be run under reduced pressure, at superimposed pressure and at atmospheric pressure. It is preferred to operate at autogenous pressure in the equipment employed.

The reaction will proceed under a wide range of temperatures from about 0 to about 150° C.

The examples which follow are intended to illustrate the invention, not to limit it. All parts or percentages are by weight, unless otherwise specifically indicated.

Example 1

A solution of 9.85 g. of N-methyl-N-vinyl-benzenesulfonamide and 10.1 g. of n-dodecyl mercaptan in 50 ml. benzene was added to a 250 ml. round bottomed flask equipped with a stirrer and condenser. Three drops of concentrated sulfuric acid were added during a fifteen-minute period. The temperature of the mixture rose to 32° C. The reaction mixture was stirred for an additional hour, and then neutralized with anhydrous $Na_2CO_3$. The crude product was filtered and the benzene was distilled under reduced pressure. The yield of

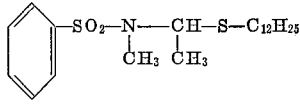

was 16.6 g., or 84.4% of theory. The product was a light yellow liquid with an $n_D^{25}$ of 1.5090. On analysis it was found to contain 63.73% carbon and 9.33% hydrogen. Theory requires 63.42% C and 9.38% H.

Example 2

A solution of 11.1 g. of p-chlorobenzyl mercaptan in 20 ml. methylene chloride in a 250 ml. round bottomed flask was acidified with anhydrous HCl. A solution of 13.8 g. N-methyl-N-vinyl benzene sulfonamide dissolved in 20 ml. methylene chloride was added over a period of fifteen minutes. The reaction mixture was stirred for fifteen minutes after adding the above vinyl sulfonamide. The solvent was removed by reduced pressure distillation leaving 24.5 g. of a light green slightly viscous liquid having an index of refraction of 1.5870 at 25° C. The product contained 54.16% carbon and 4.90% H.

Example 3

A solution of 14.5 g. of p-chlorobenzenethiol in 50 ml. methylene chloride was acidified with anhydrous HCl. A solution of 22.9 g. of N-methyl-N-vinyl-benzene sulfonamide was added to the thiol solution over a 45-minute period. The temperature of the mixture rose to 30° C. The mixture was stirred for an additional fifteen minutes, neutralized with anhydrous ammonia and filtered. After removal of the solvent by vacuum distillation, there remained 30.6 g. of a yellow liquid having a refractive index of 1.5918 at 25° C.

By substituting N-alkyl-N-vinyl sulfonamides of the generic formula

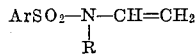

such as N-ethyl-N-vinyl-diphenylsulfonamide, N-butyl-N-vinyl - p - chlorobenzenesulfonamide, N - ethyl - N-vinyl-p-toluenesulfonamide, N - methyl - N - vinyl - 3,4 - dichlorobenzenesulfonamide and N - methyl - N - vinyl - 1-naphthylenesulfonamide, and other thiols of the generic formula HSR', where Ar, R and R' have the designation above, for the N-alkyl-N-vinyl sulfonamide and thiol of the specific examples, products having the structure

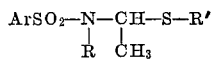

are obtained.

A solution of 5 g. of cellulose acetate (HL-120) in 55 ml. of acetone was prepared. To 22 ml. of the solution was added 0.6 g. of the sulfonamide of Example 3. A film was cast on a glass plate using a 10-mil doctor blade. On evaporation of the solvent, a clear, non-odorous, flexible film was obtained.

I claim:
1. A composition of the structure

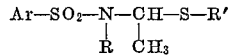

wherein Ar is a member selected from the class consisting of phenyl, naphthyl, and biphenyl groups, substituted derivatives of said phenyl, naphthyl, and biphenyl groups having from 1 to 3 lower alkyl groups of from 1 to 4 C atoms, and halogen substituted derivatives of said aryl groups having 1 to 4 halogen atoms, R is a lower alkyl group of 1 to 4 C atoms and R' is a member selected from the class consisting of alkyl groups of from 1 to 18 C atoms and phenyl and benzyl groups each having an aggregate of from 0 to 3 substituents selected from the class consisting of lower alkyl groups of from 1 to 4 C atoms, and halogen atoms or a combination of such alkyl groups or halogen atoms.

2. The composition of claim 1 in which Ar is phenyl.
3. The composition of claim 1 in which R' is an alkyl group of 1–18 carbon atoms.
4. The composition of claim 1 in which Ar is phenyl and R' is an alkyl group of 12 carbon atoms.
5. The composition of claim 1 in which Ar is phenyl and R' is a p-chlorobenzyl group.
6. The composition of claim 1 in which Ar is phenyl and R' is a p-chlorophenyl group.
7. A composition of claim 1 of the structure

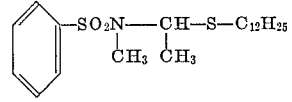

8. A composition of claim 1 having the structure

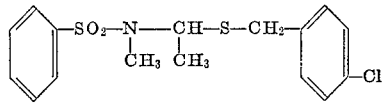

9. A composition of claim 1 having the structure

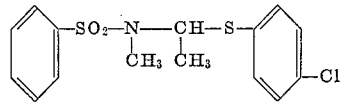

References Cited

Schulze et al.: C.A. 43:2219–20 (3-1949).
Reid: Org. Chem. of Bivalent, Sulfur, vol. II (Chem. Pub. Co., New York, 1960).

HENRY R. JILES, Primary Examiner
C. M. SHURKO, Assistant Examiner

U.S. Cl. X.R.
260—30.8